United States Patent Office 3,118,237
Patented Jan. 21, 1964

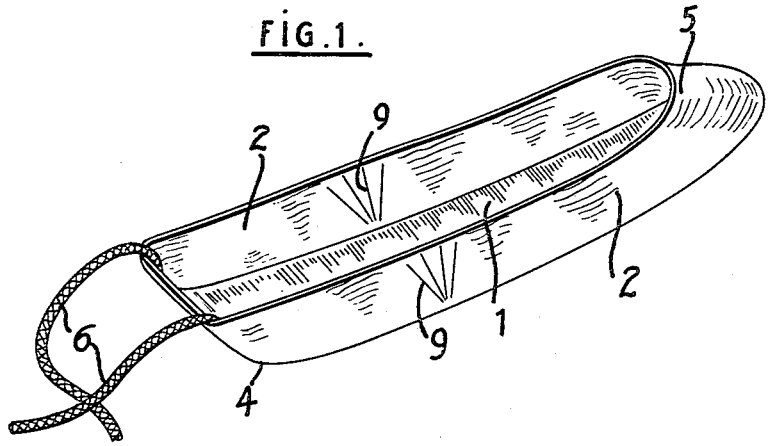
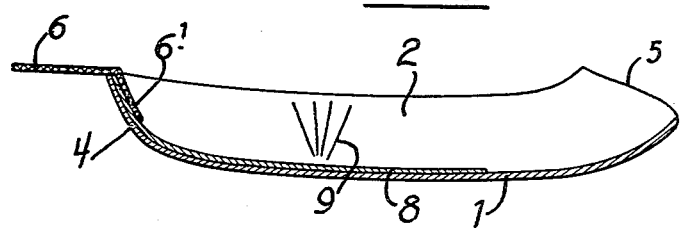
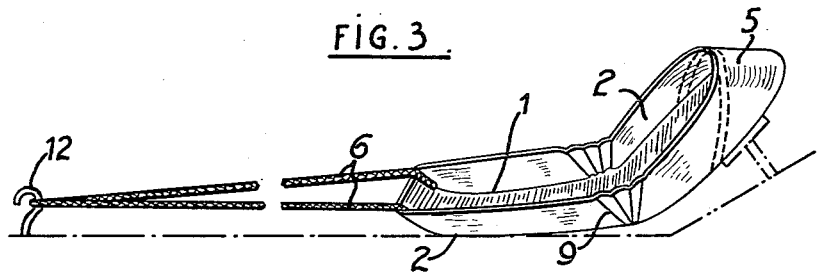

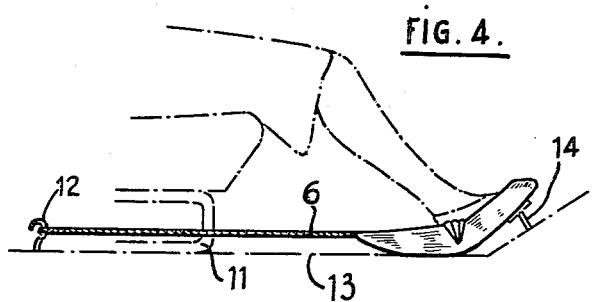
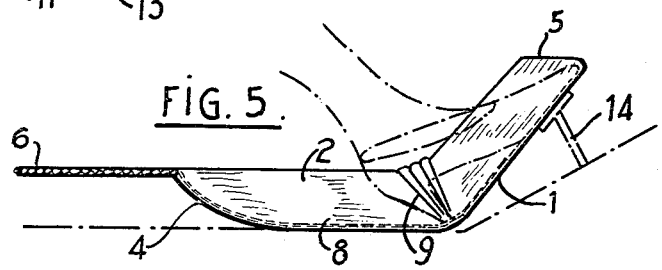
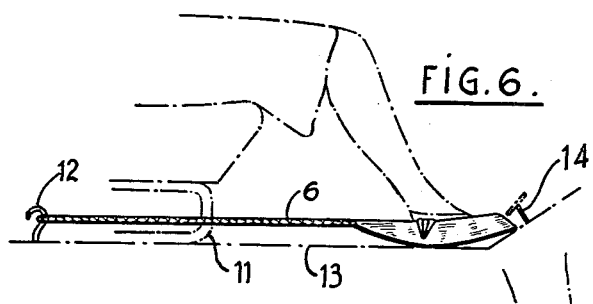
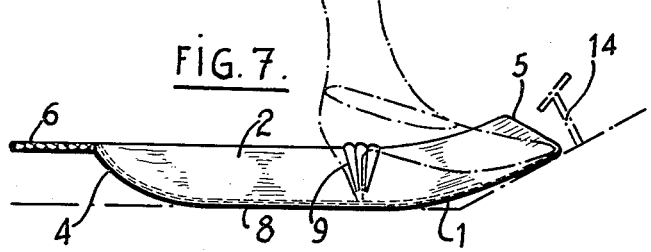

3,118,237
SHOE-PROTECTING DEVICES FOR DRIVERS OF MOTOR OR OTHER VEHICLES
Wilhelmine Flore Edmonde Marie Louise Burny, 180 Ave. Winston Churchill, Brussels, Belgium
Filed Aug. 2, 1960, Ser. No. 46,916
Claims priority, application Belgium Aug. 4, 1959
4 Claims. (Cl. 36—72)

This invention relates to a device of very simple design intended to protect the shoes of the operator of a motor-vehicle, and reduce the wear on the shoes when the driver carries out the various operations requiring use of the feet for operation of the vehicle.

This device is characterized essentially in that it comprises a movable base adapted for supporting the shoe on a foot of the operator, and resilient means fixed at one end to said base and at the other end beneath the seat or to the floor of the vehicle for returning the movable base in the rearward direction when a clutching, braking or acceleration operation is completed.

In order that the invention may be more readily understood, one non-limitative embodiment will now be described by way of example with reference to the accompanying drawings, in which:

FIGURE 1 is a perspective view of the shoe-protector according to the invention.

FIGURE 2 is a longitudinal sectional view of the shoe-protector of FIG. 1.

FIGURE 3 is a perspective view of the protector showing the resilient means thereof fixed at a rearward position of the protector.

FIGURE 4 is a side elevation showing in solid lines the protector during operation of a pedal of the vehicle.

FIGURE 5 shows the protector of FIG. 4 on an increased scale.

FIGURE 6 shows the protector of FIG. 4 in a released position; and

FIGURE 7 shows the protector of FIG. 6 on an increased scale.

The protector for the shoe of a motor vehicle operator comprises a flexible base 1 for supporting the shoe on the driver's foot.

This base is provided with lateral upstanding walls or edges 2 for restricting lateral movement of the shoe relative to the base 1 and at the front portion the walls 2 merge into a stop 5 shaped as a shoe upper.

This stop serves to restrict the shoe of the user with respect to movement in the forward direction relative to the base 1.

At its rear portion the base is raised and forms a rounded edge 4 with the walls 2. The base, walls, and stop define a cavity adapted for accommodating the shoe of the user.

The length of the base exceeds that of the shoe and the width of the base is sufficient to permit easy engagement and disengagement of the shoe in said protector.

Fan shaped creases 9 or folds are provided on each of the lateral walls 2 in symmetrical relation so as to enable respective portions of said base to pivot about an axis which is transverse with respect to said base and which passes through the fan shaped creases 9. Thus as seen in FIGS. 3-5 the base is shown in folded form with first and second portions pivoted with respect to one another.

The creases are formed substantially at locations where the heel of the shoe of the operator is adapted to bear such that the ankle of the operator is aligned with said fan shaped creases when the shoe of the operator is accommodated in the protector. This is most clearly apparent from a consideration of FIGS. 4–7.

Resilient means constituted by a pair of resilient strips 6 are sewn to the inside of the rear portion of the protector at 6' and the strips are connected to a hook 12 beneath the seat 11, the hook 12 being fastened to the floor 13 of the vehicle. The strips 6 urge the protector in a rearward longitudinal direction in such a manner that when the pedals 14 on the clutch, brake or accelerator are released by the operator's shoe (FIGS. 6 and 7), the protector is returned to a neutral position rearward of the pedals.

The base of the protector may be lined or padded with a soft material 8 except in the region of the front portion where the base may be thinned down to enable to keep a good sensitivity to contact with the pedals.

I claim:

1. A protector for the shoe of a motor vehicle operator comprising a flexible base, lateral upstanding walls on said base forming lateral margins therefor, a front step formed as a shoe upper on said base and merging with said lateral walls, said base including an upwardly curved rear portion connected to said walls, said base, walls and stop forming a cavity adapted for accommodating said shoe of the operator, said walls including fan shaped creases at a location intermediate the front stop and the rear portion of the base to permit folding of the protector about said creases, said base substantially exceeding in length that of said shoe, said fan shaped creases being located in said upstanding walls at a distance from the front stop to permit folding of said protector with the shoe accommodated therein, a pair of resilient straps connected to the base and extending rearwardly thereof for connection to a fixed member for urging the base rearwardly.

2. A protector adapted for accommodating the shoe of a motor vehicle operator during an operation involving the shoe and a pedal of the vehicle, said protector comprising: a flexible base, lateral upstanding walls on said base forming lateral margins therefor, a front stop formed as a shoe upper on said base and merging with said lateral walls, said base including an upwardly curved rear portion connected to said walls, said base, walls and stop forming a cavity adapted for accommodating said shoe of the operator, said walls including fan shaped creases at a location intermediate the front stop and the rear portion of the base to permit folding of the protector about said creases, said base substantially exceeding in length that of said shoe, said fan shaped creases being located in said upstanding walls at a distance from the front stop to permit folding of said protector with the shoe accommodated therein, a pair of resilient straps connected to the base and extending rearwardly thereof for connection to a fixed member for urging the base rearwardly to a position which is rearwards of said pedal, said straps being effective to permit the shoe of the operator to be engaged into said cavity to move the protector forwardly with the shoe into operative engagement with the pedal and against the action of the straps.

3. A protector as claimed in claim 2 wherein said base is of reduced thickness in a zone adjacent the front stop to furnish sensitivity to the operator for operating said pedal.

4. A protector for the shoe of a motor vehicle operator comprising a flexible base, lateral upstanding walls on said base forming lateral margins therefor, a front step formed as a shoe upper on said base and merging with said lateral walls, said base including an upwardly curved rear portion connected to said walls, said base, walls and stop forming a cavity adapted for accommodating said shoe of the operator, means in said walls to permit folding of the protector about a transverse axis between the front stop and the rear portion of the base with the shoe accommodated therein, and resilient straps connected to the base and extending rearwardly thereof for connection to a fixed member for urging the base rearwardly.

References Cited in the file of this patent

UNITED STATES PATENTS

| | | |
|---|---|---|
| 175,252 | Milwain | Mar. 28, 1876 |
| 461,492 | Browning | Oct. 20, 1891 |
| 958,617 | Frankenhoff | May 17, 1910 |
| 988,159 | Wiltse | Mar. 28, 1911 |
| 2,078,444 | Gamble | Apr. 27, 1937 |